US012348802B2

(12) United States Patent
Choi et al.

(10) Patent No.: US 12,348,802 B2
(45) Date of Patent: Jul. 1, 2025

(54) TECHNIQUES FOR BYPASSING THE DOMAIN NAME SYSTEM (71) Applicant: NETFLIX, INC., Los Gatos, CA (US)

(72) Inventors: Sekwon Choi, Los Gatos, CA (US); Andrew Chen, Sunnyvale, CA (US)

(73) Assignee: NETFLIX, INC., Los Gatos, CA (US)

( * ) Notice: Subject to any disclaimer, the term of this patent is extended or adjusted under 35 U.S.C. 154(b) by 326 days.

(21) Appl. No.: 17/001,063

(22) Filed: Aug. 24, 2020

(65) Prior Publication Data

US 2022/0060771 A1    Feb. 24, 2022

(51) Int. Cl.
*H04N 21/258* (2011.01)
*H04L 9/40* (2022.01)
*H04L 61/4511* (2022.01)
*H04L 67/02* (2022.01)

(52) U.S. Cl.
CPC ... *H04N 21/25816* (2013.01); *H04L 61/4511* (2022.05); *H04L 63/0823* (2013.01); *H04L 63/123* (2013.01); *H04L 63/18* (2013.01); *H04L 67/02* (2013.01)

(58) Field of Classification Search
CPC .......... H04N 21/25816; H04L 61/1511; H04L 63/0823; H04L 63/123; H04L 63/18; H04L 67/02
See application file for complete search history.

(56) References Cited

U.S. PATENT DOCUMENTS 9,819,513 B2 * 11/2017 Lapidous ............ H04L 12/4641
10,165,078 B1 * 12/2018 Roskind ................ H04L 61/58

2003/0174648 A1 * 9/2003 Wang ................. H04L 67/2852
370/235
2004/0073707 A1   4/2004 Dillon
2011/0153867 A1 * 6/2011 van de Ven ....... H04L 29/12811
709/245
2012/0084343 A1   4/2012 Mir et al.
(Continued)

FOREIGN PATENT DOCUMENTS

WO    WO-2014040160 A1 *  3/2014  .......... H04L 47/803
WO    WO-2017053835 A1 *  3/2017  ......... H04L 63/0823

OTHER PUBLICATIONS

International Search Report for application No. PCT/US2021/047079 dated Nov. 9, 2021, 12 pages.
(Continued)

*Primary Examiner* — Cheikh T Ndiaye
(74) *Attorney, Agent, or Firm* — Artegis Law Group, LLP (57) ABSTRACT

In various embodiments, a client application requests information relating to content servers from which particular content can be accessed, or a manifest server that maintains such information and is distinct from the Domain Name System (DNS) automatically determines that the client application is likely to request the content server information. The manifest server then transmits, to the client application, information specifying (1) hostnames associated with the content servers from which the particular content can be accessed, and (2) Internet Protocol (IP) addresses corresponding to the hostnames. Thereafter, the client application can use the IP addresses to connect to the content servers and validate certificates provided by the content servers, in order to establish secure communication channels with the content servers.

20 Claims, 6 Drawing Sheets (56) References Cited

U.S. PATENT DOCUMENTS

| | | | |
|---|---|---|---|
| 2015/0195243 A1* | 7/2015 | Roskind | H04L 61/4511 |
| | | | 709/213 |
| 2016/0234163 A1* | 8/2016 | Nistor | H04L 61/4511 |
| 2019/0229900 A1* | 7/2019 | Khristi | H04L 9/0827 |

OTHER PUBLICATIONS

Hu et al., "Specification for DNS over Transport Layer Security (TLS)", Internet Engineering Task Force (IETF), RFC 7858, May 18, 2016, 19 pages.
Rescorla et al., "The Secure HyperText Transfer Protocol", Network Working Group, Aug. 1, 1999, 46 pages.
Eastlake, D., "Domain Name System Security Extensions", Network Working Group, XP015008318, Mar. 1, 1999, 48 pages.
Anonymous, "How DNS query works", Retrieved from the Internet: URL:http://technet.microsoft.com/en-us/library/cc775637(v=ws.10).aspx, XP055123333, Jan. 21, 2005, 6 pages.

* cited by examiner

TECHNIQUES FOR BYPASSING THE DOMAIN NAME SYSTEM

BACKGROUND

Field of the Invention

Embodiments of the present disclosure relate generally to computer science and computer networking and, more specifically, to techniques for bypassing the Domain Name System.

Description of the Related Art

Internet Protocol (IP) addresses are numerical labels assigned to computing devices connected to a network, such as the Internet. IP addresses can be used to connect to computing devices to which those IP addresses are assigned. Because IP addresses are difficult for users to remember, hostnames that include human-readable characters (e.g., www.example.com) also are typically used to distinguish computing devices within a network. The Domain Name System (DNS) maintains, and can be used to obtain, mappings between hostnames and IP addresses on the Internet. To obtain the IP address associated with a particular hostname (also referred to as "resolving" the hostname), a client application can make a DNS request (also referred to as a "DNS query" or performing a DNS "lookup") specifying the hostname. In response to such a request, a recursive resolver performs recursive lookups against authoritative DNS nameservers until an authoritative DNS nameserver is reached that stores a mapping between the hostname and a corresponding IP address. The mapping between the hostname and the IP address is then returned to the client application, which can use the IP address to connect to a server associated with the hostname.

Various secure communication protocols require the use of hostnames and DNS lookups of those hostnames. For example, with respect to communications between a client application and a particular server, Hypertext Transfer Protocol Secure (HTTPS) requires that the client application verify the identity of the server by verifying a certificate sent by the server to the client application. In such cases, a conventional client application also needs to resolve the hostname of the server machine to an IP address using DNS. However, DNS has certain well-known drawbacks. One drawback is the time required for a DNS lookup, which typically includes a client application connecting to a recursive resolver, resolution of a hostname to an IP address, and returning the IP address to the client application. The time required for a DNS lookup can also vary by country and internet service provider (ISP). Another drawback is that DNS servers sometimes fail, which can make resolving certain hostnames to IP addresses impossible. In addition, DNS does not implement secure communications and, therefore, is susceptible to hacking and interceptions by malicious actors, among other things.

As the foregoing illustrates, what is needed in the art are more effective techniques for mapping hostnames to IP addresses.

SUMMARY OF THE EMBODIMENTS

One embodiment of the present disclosure sets forth a computer-implemented method for accessing data from one or more servers. The method includes receiving, from a first server and via a first secure communication channel, a mapping between a hostname associated with a second server and an Internet Protocol (IP) address. The method further includes connecting to the second server based on the IP address. In addition, the method includes establishing a second secure communication channel with the second server based on the hostname.

Another embodiment of the present disclosure sets forth a computer-implemented method for bypassing the Domain Name System (DNS). The method includes storing, in a server that is distinct from DNS, mappings between hostnames and Internet Protocol (IP) addresses. The method further includes transmitting, from the server to a client application via a secure communication channel, at least one mapping between a hostname and an IP address.

Another embodiment of the present disclosure sets forth a system. The system includes a memory storing a client application. The system further includes a processor that is coupled to the memory and, when executing the client application, is configured to perform the steps of receiving, from a first server and via a first secure communication channel, a mapping between a first hostname associated with a second server and a first Internet Protocol (IP) address, connecting to the second server based on the first IP address, and establishing a second secure communication channel with the second server based on the first hostname.

At least one technical advantage of the disclosed techniques relative to the prior art is that the disclosed techniques transmit mappings between hostnames and IP addresses directly to client applications via secure communication channels, without requiring the hostname to be resolved using DNS. As a result, the disclosed techniques can save time that would otherwise be required for DNS lookups. The disclosed techniques are also unaffected by problems that can occur in the DNS system, such as DNS server failures. Further, the use of secure communication channels to transmit the mappings between hostnames and IP addresses avoids various security vulnerabilities associated with DNS, including the susceptibility of DNS to hackers and interceptions by malicious actors. These technical advantages represent one or more technological advancements over prior art approaches.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

As described, conventional approaches for mapping hostnames to IP addresses on the Internet rely on the Domain Name System (DNS). In addition, various secure communication protocols require the use of hostnames and DNS lookups of such hostnames. However, DNS has well-known drawbacks, including the time required for DNS lookups, which can vary by country and internet service provider (ISP), DNS server failures, and the lack of secure communications.

The disclosed techniques transmit mappings between hostnames and IP addresses directly to client applications via secure communication channels, without requiring the hostname to be resolved using DNS. In the disclosed techniques, a client application requests information relating to content servers from which particular content can be accessed, or a manifest server that and is distinct from the DNS automatically determines that the client application is likely to request such information. In response, the manifest server transmits, to the client application, information specifying (1) hostnames associated with content servers from which the particular content can be accessed, and (2) IP addresses corresponding to the hostnames. Thereafter, the client application can use the IP addresses to connect to the content servers, request certificates from the content servers, and validate certificates provided by the content servers to establish a secure communication channel, such as a Hypertext Transfer Protocol Secure (HTTPS) channel.

Advantageously, the disclosed techniques address various limitations of conventional approaches for mapping hostnames to IP addresses. More specifically, the disclosed techniques bypass DNS and, therefore, save time that would otherwise be required for DNS lookups. The disclosed techniques are also unaffected by problems that can occur in the DNS system, such as DNS server failures. Further, the use of secure communication channels to transmit the mappings between hostnames and IP addresses avoids various security vulnerabilities associated with DNS, including the susceptibility of DNS to hackers and interceptions by malicious actors.

System Overview

Figure 1:
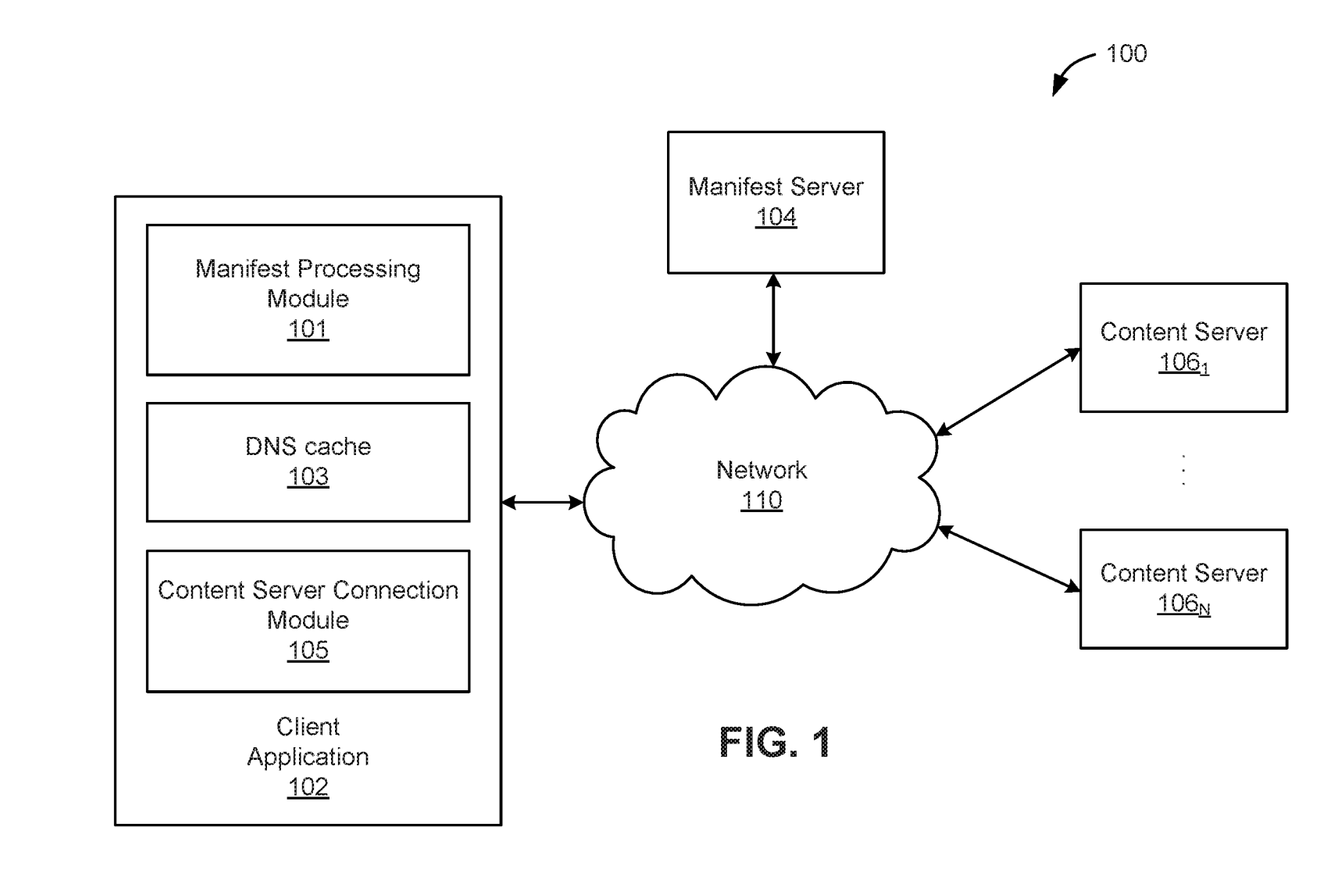
FIG. 1 is a conceptual illustration of a system that is configured to implement one or more aspect of the various embodiments.

FIG. 1 is a conceptual illustration of a system 100 that is configured to implement one or more aspects of the various embodiments. As shown, the system 100 includes a client application 102, a manifest server 104, and content servers $106_{1-N}$ (collectively referred to as content servers 106 and individually referred to as a content server 106) that communicate over a network 110 such as the Internet.

The content servers 106 serve data to client applications such as the client application 102. For example, a streaming video service could include content servers that serve video, audio, and subtitle data. More generally, the content servers 106 can serve any suitable data to client applications. In some embodiments, each of the content servers 106 can store different content data. In other embodiments, one or more of the content servers can store the same content data. Although described herein primarily with respect to content servers, techniques disclosed herein are also applicable to other types of servers.

The client application 102 can be a web browser or any other technically feasible software application that is capable of accessing content stored on the content servers 106 (and/or other servers). For example, the client application 102 could be a dedicated application for browsing and watching streaming videos.

The manifest server 104 stores information indicating which content server(s) 106 the client application 102 should connect to in order to access various data stored on the content servers 106, as well as hostnames and IP addresses of the content servers 106. Returning to the streaming video example, the video, audio, and subtitle data associated with videos could be stored across different content servers 106. As another example, different content servers 106 could store video data that is encoded differently (e.g., at different bit rates). In such cases, the manifest server 104 can maintain information (e.g., metadata) indicating where video, audio, and subtitle data is stored across the content servers 106. In addition, the manifest server 104 can provide, to the client application 102, information relating to content servers 106 where data for particular videos can be accessed, including the hostnames and corresponding IP addresses of those content servers 106. Such information indicating where data relating to particular content can be accessed on the content servers 106 is also referred to herein as a "manifest." Notably, the manifest server 104 is distinct from DNS and provides hostname to IP address mappings directly to the client application 102, without relying on DNS.

In some embodiments, the client application 102 requests, from the manifest server 104, the information relating to content servers 106 from which particular content can be accessed in response to user input. Returning to the streaming video example, a user may select to watch a particular video, in which case the client application 102 could request information relating to content servers 106 from which data (e.g., video, audio, subtitles) for the particular video can be accessed.

In some embodiments, the manifest server 104 can also use predictive techniques to automatically determine that the client application 102 is likely to request certain content server information. Any technically feasible predictive techniques (e.g., machine learning techniques) may be employed. For example, the manifest server 104 could perform prefetching in which the manifest server 104 determines particular video(s) that a user of the client application 102 is likely to select when the client application 102 is started, as well as the content servers 106 storing data associated with those video(s).

In response to the request from the client application 102, and/or to determining that the client application 102 is likely to request certain content server information, the manifest server 104 transmits content server information including mappings between hostnames and IP addresses associated with the content servers to the client application 102 via a secure communication channel. It should be understood that, as such mappings are transmitted by the manifest server 104 to the client application 102, the hostnames do not need to be resolved to IP addresses using DNS. Instead, the client application 102 can use the IP addresses received from the manifest server 102 to connect to the content servers 106. A content server 106 to which the client application 102 connects can then send, to the client application 102, a certificate that includes a hostname. The client application 102 can validate the certificate by determining a hostname to which the client is attempting to reach matches the hostname in the certificate.

As shown, the client application 102 includes a manifest processing module 101, a DNS cache 103 and a server connection module 105. The manifest processing module 101 processes manifests including content server information that is received from the manifest server 104 in order to determine hostnames, IP addresses, and mappings between hostnames and IP addresses specified in such manifests, among other things. The manifest processing module 101 then stores the mappings between hostnames and IP addresses in the DNS cache 103. For example, the manifest processing module 101 could use an application programming interface (API) to add the mappings between hostnames and IP addresses to the DNS cache 103.

The server connection module 105 connects to the content servers 106 and accesses content hosted by the content servers 106. When connecting to one of the content servers 106 that is associated with a particular hostname, the server connection module 105 first determines whether a mapping between the hostname and the IP address is stored in the DNS cache 103. If the mapping is stored in the DNS cache 103, then the server connection module 105 uses the IP address that the hostname maps to in the DNS cache 103 to connect to one of the content servers 106, without performing a DNS lookup. If no such mapping is stored, then the server connection module 105 transmits a DNS request to resolve the hostname to an IP address.

For explanatory purposes only, one client application 102, one manifest server 104, and content servers 106 are shown in FIG. 1. However, as persons skilled in the art will recognize, the system 100 may generally include any number of client applications, each of the client application 102, the manifest server 104, and the content servers 106 may run on one or more physical computing systems or virtual computing systems running in, e.g., a data center or cloud. Further, functionality of the client application 102, the manifest server 104, and the content servers 106 may be distributed across any number of other computing devices, or functionality of any number of applications may be consolidated into a single application or subsystem.

Figure 2:
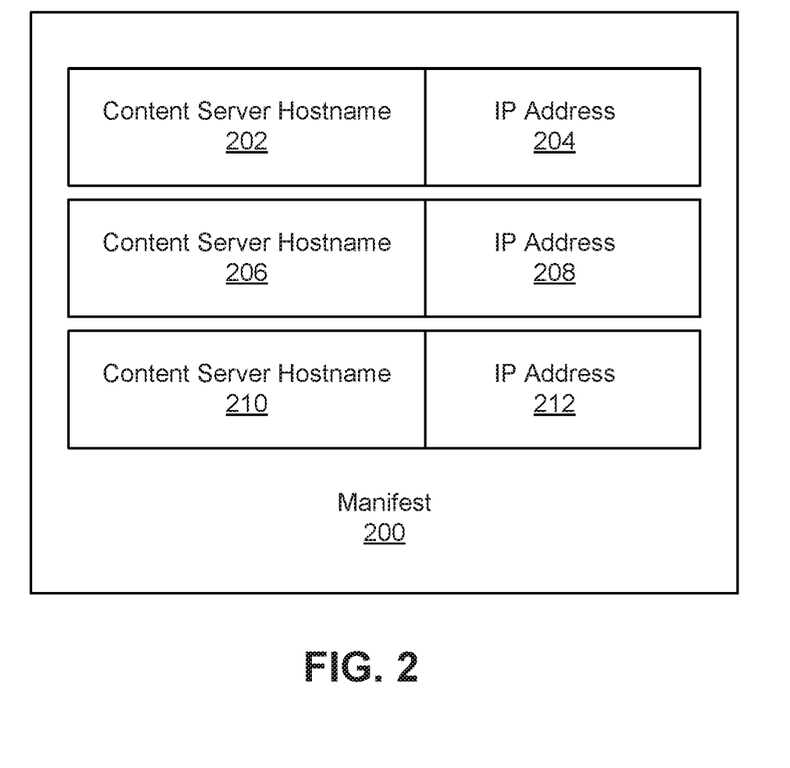
FIG. 2 is a conceptual illustration of a manifest that can be generated by the manifest server of FIG. 1, according to various embodiments.

FIG. 2 is a conceptual illustration of a manifest 200 that can be generated by the manifest server 104 of FIG. 1, according to various embodiments. As shown, the manifest 200 includes information relating to content servers (e.g., one or more of the contents servers 106 or 110) from which particular content can be accessed by the client application 102. As described, in the video streaming example, the particular content could be a video that a user has selected to watch or that the manifest server 104 has determined the user is likely to select via predictive algorithm(s). The video, audio, and subtitle data that is associated with the video could be stored across multiple content servers 106.

Illustratively, the manifest server 104 generates the manifest 200 to include content server hostnames 202, 206, and 210 from which particular content can be accessed by the client application 102, as well as corresponding IP addresses 204, 208, and 218 that can be used to connect to the content servers 106. In some embodiments, the hostnames and IP addresses included in the manifest 200 may be associated with content servers that host content specific to a client device on which the client application 102 runs. In addition, the content servers may be at efficient locations, such as in close proximity to the client device. For example, one or more of the content servers could store videos having a particular resolution that can be played back on the client device, and some of those content servers could be located closer to the client device than other content servers. Upon receiving the manifest 200 via a secure communication channel, the client application 102 can use the IP addresses 204, 208, and 212 to connect to the corresponding content servers 106, without relying on DNS. Further, the client application 102 can use the content server hostnames 202, 206, and 210 to establish a secure connection, such as an HTTPS connection, to the content servers.

In some embodiments, the manifest 200 may also include information other than hostnames and IP addresses of content servers. For example, the manifest could include information specifying the content data stored on the content servers. As another example, the manifest 200 could include expiration times for the mappings between content server hostnames and IP addresses. Such expiration times permit mappings between content server hostname and IP addresses to be modified on the server side (after the mappings expire).

Figure 3:
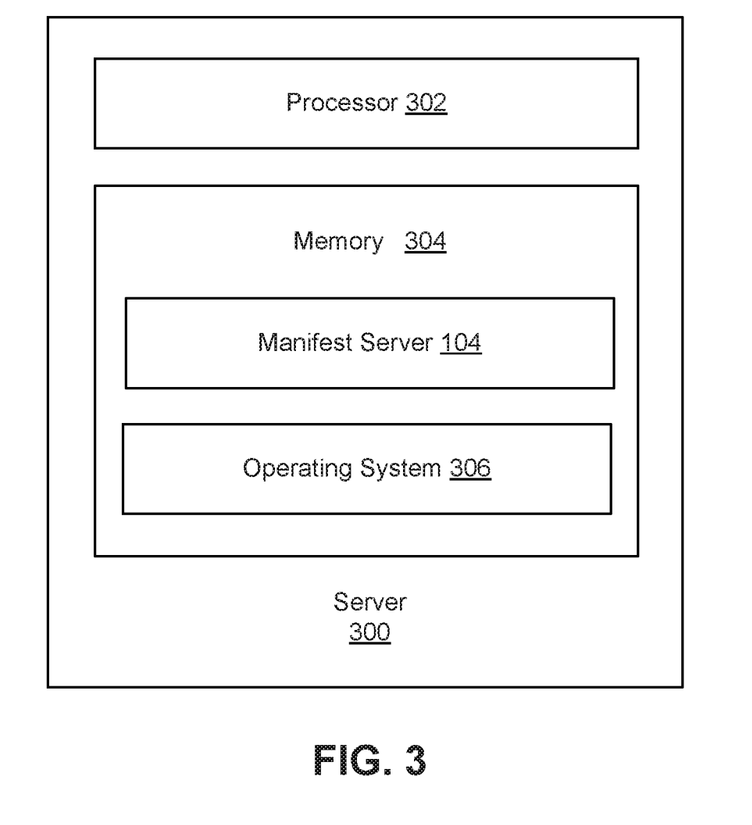
FIG. 3 is a conceptual illustration of a server machine in which the manifest server of FIG. 1 is implemented, according to various embodiments.

FIG. 3 is a conceptual illustration of a server machine 300 in which the manifest server 104 of FIG. 1 is implemented, according to various embodiments. Although described herein with respect to the server machine 300, it should be understood that the manifest server 104 can generally run on any technically feasible computing device that is connected to a network, such as the Internet. As shown, the server machine 300 includes, without limitation, a processor 302 and a memory 304. The processor 302 may be any instruction execution system, apparatus, or device capable of executing instructions. For example, the processor 402 could comprise a central processing unit (CPU), a graphics processing unit (GPU), a controller, a microcontroller, a state machine, or any combination thereof. The memory 304 stores content, such as software applications and data, for use by the processor 302.

The memory 304 may be one or more of a readily available memory, such as random access memory (RAM), read only memory (ROM), floppy disk, hard disk, or any other form of digital storage, local or remote. In some embodiments, a storage (not shown) may supplement or replace the memory 304. The storage may include any number and type of external memories that are accessible to the processor 302. For example, and without limitation, the storage may include a Secure Digital Card, an external flash memory, a portable compact disc read-only memory (CD-ROM), an optical storage device, a magnetic storage device, or any suitable combination of the foregoing.

As shown, the memory 304 stores the manifest server 104 and an operating system 306 on which the manifest server 104 runs. The operating system 306 may be, e.g., Linux®, Microsoft Windows®, or Android™. The manifest server 104 may be a service, application, or other type of software that runs on the operating system 406. For example, in some embodiments, the manifest server 104 may be a microservice in a video streaming service (or other type of service) having a microservice architecture. Functionality of the manifest server 104 may also be distributed across multiple pieces of software in some embodiments. In some embodiments, the manifest server 104 is configured to store information indicating which content server(s) 106 the client application 102 should connect to in order to access various data stored on the content servers 106. In addition, the manifest server can respond to user requests for information relating to content servers from which particular content can be accessed, and/or automatically determine that the client application 102 is likely to request such information using predictive technique(s). In such cases, the manifest server transmits, to the client application 102 via a secure communication channel, information specifying (1) hostnames associated with the content servers from which the particular content can be accessed, and (2) IP addresses corresponding to the hostnames, as discussed in greater detail below in conjunction with FIG. 5.

Figure 4:
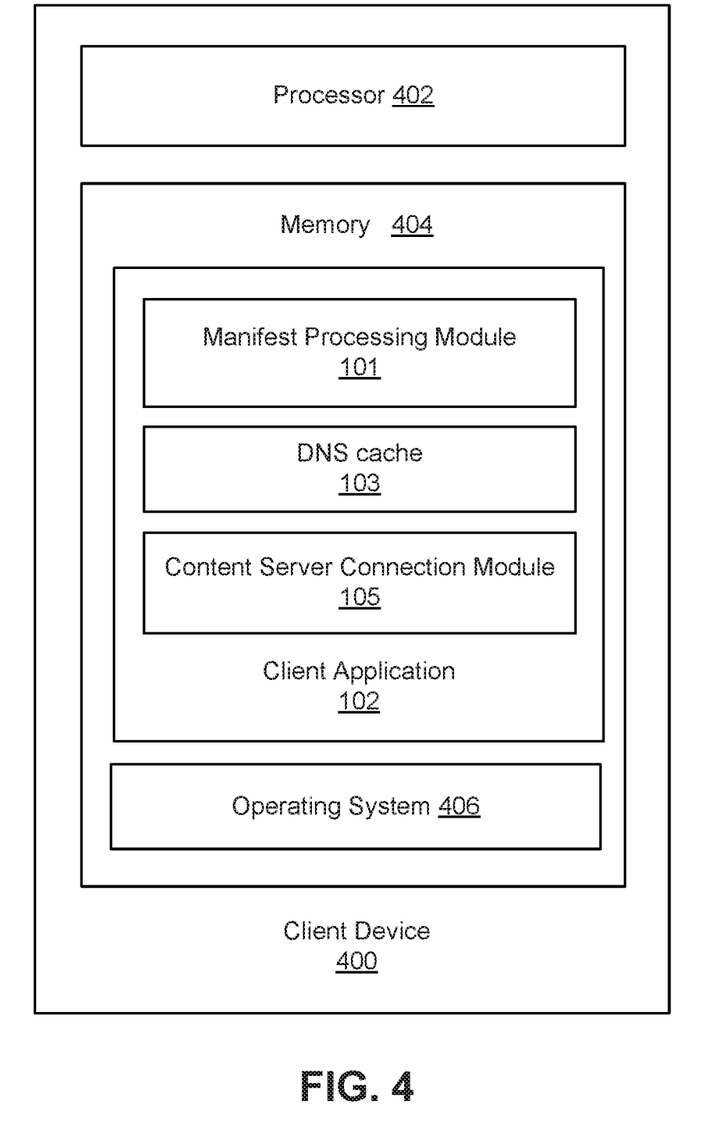
FIG. 4 is a conceptual illustration of a client device in which the client application of FIG. 1 is implemented, accordingly to various embodiments.

FIG. 4 is a conceptual illustration of a client device 400 in which the client application 102 of FIG. 1 is implemented, accordingly to various embodiments. Although described herein with respect to the client device 400, it should be understood that the client application 102 can generally run on any type of computing device that is connected to a network, such as the Internet. As shown, the client device 400 includes a processor 402 and a memory 404, which may perform similar functionalities as the processor 302 and the memory 304, respectively, of the server machine 300 described above in conjunction with FIG. 3. In some embodiments, a storage (not shown) may supplement or replace the memory 404.

As shown, the memory 404 stores the client application 102 and an operating system 406, which is similar to the operating system 306 described above in conjunction with FIG. 3. The client application 102 is configured to receive content server information including mappings between hostnames and IP addresses and to use such information to communicate with the content servers 106, thereby bypassing DNS, as discussed in greater detail below in conjunction with FIG. 6. As shown, the client application 102 includes the manifest processing module 101 that processes manifests including content server information that is received from the manifest server 104, the DNS cache 103 in which mappings between hostnames and IP addresses from manifests can be stored, and the server connection module 105 that uses IP addresses to which hostnames map in the DNS cache 103 to connect to the content servers 106, when such mappings are stored in the DNS cache 103.

Bypassing the Domain Name System

Figure 5:
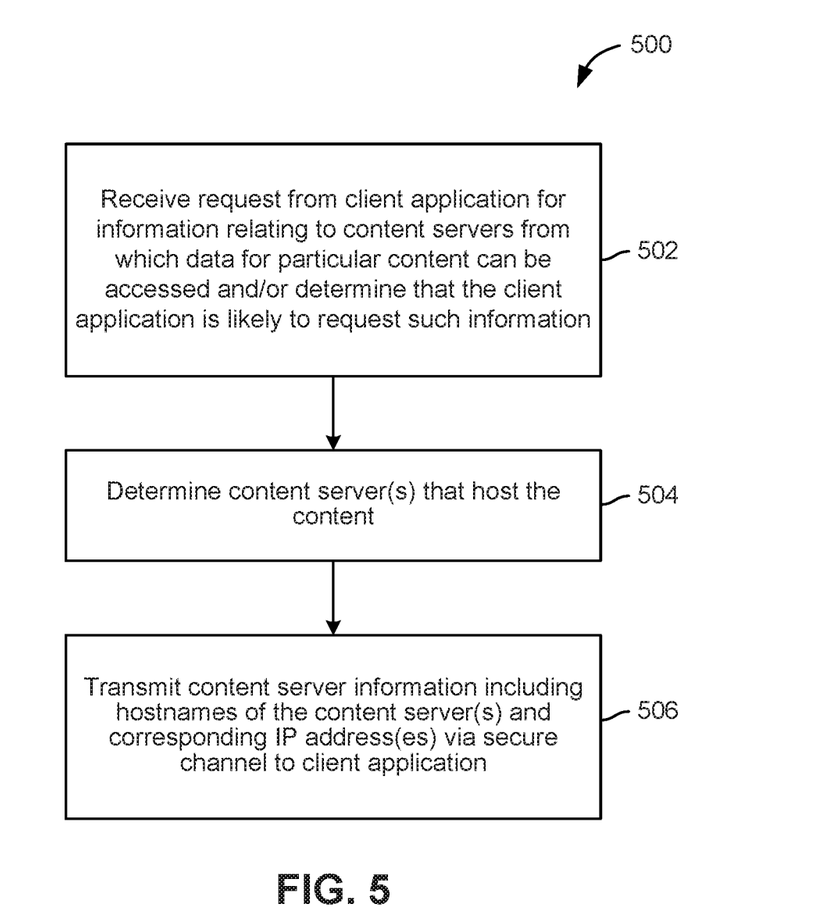
FIG. 5 is a flow diagram of method steps for transmitting content server information to a client application, according to various embodiments.

FIG. 5 is a flow diagram of method steps for transmitting content server information to the client application 102, according to various embodiments. Although the method steps are described with reference to the systems of FIGS. 1-4, persons skilled in the art will understand that any system configured to implement the method steps, in any order, falls within the scope of the present disclosure.

As shown, a method 500 begins at step 502, where the manifest server 104 receives a request from the client application 102 for information relating to content servers from which data for particular content can be accessed and/or determines that the client application 102 is likely to request such information. As described, the request from the client application 102 may be in response to a user selection, such as selection of a video to watch. In addition, the manifest server 104 can determine that the client application 102 is likely to request information relating to particular content server(s) using predictive technique(s).

At step 504, the manifest server 104 determines the information relating to the content server(s) 106 that host the particular content. As described, the manifest server 104 stores information indicating which content servers 106 can be used to access data, such as video, audio, subtitles, etc. for particular content, such as a streaming video. The content servers 106 may also be at efficient locations, such as in close proximity to the client device. In addition, the manifest server 104 stores information (e.g., metadata) indicating hostnames and IP addresses associated with the content servers 106.

At step 506, the manifest server 104 transmits content server information including hostname(s) of the content server(s) determined at step 504 and corresponding IP address(es) via a secure communication channel to the client application 102. The secure communication channel can be established in any technically feasible manner. For example, the client application 102 could verify that a certificate received from the manifest server 104 was generated by a trusted certificate authority. It should be understood that such a certificate is difficult for malicious actors to duplicate.

Figure 6:
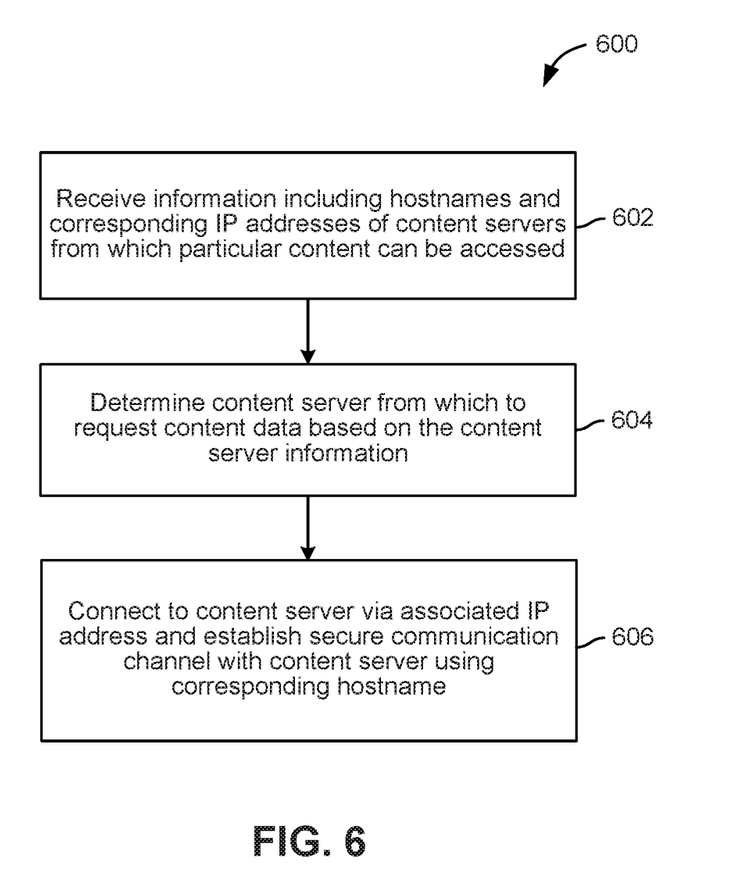
FIG. 6 is a flow diagram of method steps for communicating with a content server, according to various embodiments.

FIG. 6 is a flow diagram of method steps for the client application 102 to communicate with one of the content servers 106, according to various embodiments. Although the method steps are described with reference to the systems of FIGS. 1-4, persons skilled in the art will understand that any system configured to implement the method steps, in any order, falls within the scope of the present disclosure.

As shown, a method 600 begins at step 602, where the client application 102 receives information including hostname(s) and corresponding IP addresses of content server(s) from which particular content can be accessed. Such information may be generated and transmitted by the manifest server 104 to the client application 102 according to steps of the method 500, described above in conjunction with FIG. 5.

At step 604, the client application 102 determines a content server from which to request content data based on the information received at step 602. Although described herein with respect to a single content server, it should be understood that steps 604 and 606 of the method 600 can be repeated by the client application 102 to communicate with any number of content servers, such as content servers that store video, audio, and subtitle data for a streaming video.

At step 606, the client application 102 connects to the content server 106 via an associated IP address and establishes a secure communication channel with the content server 106 using a hostname corresponding to the IP address. As described, information indicating the hostnames and corresponding IP addresses that are associated with particular content servers 106 can be received from the manifest server 102 at step 602. In some embodiments, the client application 102 (and, in particular, the manifest processing module 101) can store such hostnames and corresponding IP addresses in the DNS cache 103 described above in conjunction with FIGS. 1 and 4. In such cases, the client application 102 (and, in particular, the server connection module 105, can determine whether a mapping between a hostname for the content server determined at step 604 and an IP address is stored in the DNS cache 103. The client application (and, in particular, the server connection module 105) only performs a DNS lookup if such a mapping is not stored in the DNS cache 103.

At least one technical advantage of the disclosed techniques relative to the prior art is that the disclosed techniques transmit mappings between hostnames and IP addresses directly to client applications via secure communication channels, without requiring the hostname to be resolved using DNS. As a result, the disclosed techniques can save time that would otherwise be required for DNS lookups. The disclosed techniques are also unaffected by problems that can occur in the DNS system, such as DNS server failures. Further, the use of secure communication channels to transmit the mappings between hostnames and IP addresses avoids various security vulnerabilities associated with DNS, including the susceptibility of DNS to hackers and interceptions by malicious actors. These technical advantages represent one or more technological advancements over prior art approaches.

1. In some embodiments, a computer-implemented method for accessing data from one or more servers comprises receiving, from a first server and via a first secure communication channel, a mapping between a hostname associated with a second server and an Internet Protocol (IP) address, connecting to the second server based on the IP address, and establishing a second secure communication channel with the second server based on the hostname.

2. The computer-implemented method of clause 1, further comprising establishing the first secure communication channel with the first server, wherein the first server is distinct from the Domain Name System (DNS).

3. The computer-implemented method of clauses 1 or 2, wherein establishing the first secure communication channel comprises verifying a certificate received from the first server.

4. The computer-implemented method of any of clauses 1-3, further comprising storing the mapping between the hostname associated with the second server and the IP address in a cache, wherein the IP address stored in the cache is used when connecting to the second server machine.

5. The computer-implemented method of any of clauses 1-4, wherein the cache further stores one or more mappings between one or more hostnames and one or more IP addresses determined via the Domain Name System (DNS).

6. The computer-implemented method of any of clauses 1-5, wherein one or more additional mappings between one or more hostnames and one or more IP addresses are received from the first server via the first secure communication channel.

7. The computer-implemented method of any of clauses 1-6, wherein the one or more additional mappings are associated with one or more other servers that host content.

8. The computer-implemented method of any of clauses 1-7, wherein establishing the second secure communication channel with the second server comprises validating a certificate received from the second server.

9. In some embodiments, a computer-implemented method for bypassing the Domain Name System (DNS) comprises storing, in a server that is distinct from DNS, mappings between hostnames and Internet Protocol (IP) addresses, and transmitting, from the server to a client application via a secure communication channel, at least one mapping between a hostname and an IP address.

10. The computer-implemented method of clause 9, wherein the at least one mapping between the hostname and the IP address comprises a plurality of mappings between hostnames and IP addresses associated with additional servers that host content.

11. The computer-implemented method of clauses 9 or 10, wherein the additional servers host at least one of videos, audios, or subtitles.

12. The computer-implemented method of any of clauses 9-11, wherein the secure communication channel is established by performing steps comprising transmitting, by the server to the client application, a certificate generated by a certificate authority.

13. The computer-implemented method of any of clauses 9-12, further comprising storing in the server, information indicating content hosted by other servers, and transmitting, from the server to the client application via the secure communication channel, information indicating content hosted by one or more of the other servers that are associated with the at least one mapping between the hostname and the IP address.

14. The computer-implemented method of any of clauses 9-13, wherein the client application is a web browser.

15. The computer-implemented method of any of clauses 9-14, wherein the client application is a video streaming application.

16. In some embodiments, a system comprises a memory storing a client application, and a processor that is coupled to the memory and, when executing the client application, is configured to perform the steps of receiving, from a first server and via a first secure communication channel, a mapping between a first hostname associated with a second server and a first Internet Protocol (IP) address, connecting to the second server based on the first IP address, and establishing a second secure communication channel with the second server based on the first hostname.

17. The system of clause 16, the steps further comprising establishing the first secure communication channel with the first server, wherein the first server is distinct from the Domain Name System (DNS).

8. The system of clauses 16 or 17, the steps further comprising storing the mapping between the first hostname associated with the second server and the first IP address in a cache, wherein the cache further stores one or more mappings between one or more hostnames and one or more IP addresses determined via the Domain Name System (DNS).

19. The system of any of clauses 16-18, the steps further comprising determining that a mapping between a second hostname and a second IP address is not stored in the cache, and determining the mapping between the second hostname and the second IP address via DNS.

20. The system of any of clauses 16-19, wherein the second secure communication channel is a Hypertext Transfer Protocol Secure (HTTPS) channel.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general-purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for accessing data from one or more servers, the method comprising:
   receiving, by a client device from a first server and via a first secure communication channel, a mapping between a first hostname associated with a second server and an Internet Protocol (IP) address, wherein the mapping is prefetched by the first server without receiving a request from the client device and in response to the first server determining that information associated with the first hostname is likely to be requested;
   connecting to the second server based on the IP address; and
   establishing a second secure communication channel with the second server based on a match between the first hostname included in the mapping and a second hostname included in a first certificate.

2. The computer-implemented method of claim 1, further comprising establishing the first secure communication channel with the first server.

3. The computer-implemented method of claim 2, wherein establishing the first secure communication channel comprises verifying a second certificate received from the first server.

4. The computer-implemented method of claim 1, further comprising storing the mapping between the first hostname associated with the second server and the IP address in a cache, wherein the IP address stored in the cache is used when connecting to the second server.

5. The computer-implemented method of claim 4, wherein the cache further stores one or more mappings between one or more hostnames and one or more IP addresses determined via the Domain Name System (DNS).

6. The computer-implemented method of claim 1, wherein one or more additional mappings between one or more hostnames and one or more IP addresses are received from the first server via the first secure communication channel.

7. The computer-implemented method of claim 6, wherein the one or more additional mappings are associated with one or more other servers that host content.

8. The computer-implemented method of claim 1, wherein establishing the second secure communication channel with the second server comprises validating the first certificate received from the second server based on the match between the first hostname included in the mapping and the second hostname included in the first certificate.

9. A computer-implemented method for bypassing the Domain Name System (DNS), the method comprising:
   determining, by a first server, that a client application is likely to request information associated with one or more hostnames;
   in response to determining that the client application is likely to request the information associated with the one or more hostnames and without receiving a request from the client application, prefetching, by the first server, mappings between the one or more hostnames and one or more Internet Protocol (IP) addresses; and
   transmitting, from the first server to the client application via a first secure communication channel, at least one mapping between a first hostname and an IP address, wherein the client application establishes a second secure communication channel with a second server based on a match between the first hostname included in the at least one mapping and a second hostname included in a first certificate.

10. The computer-implemented method of claim 9, wherein the at least one mapping between the first hostname and the IP address comprises a plurality of mappings between hostnames and IP addresses associated with additional servers that host content.

11. The computer-implemented method of claim 10, wherein the additional servers host at least one of videos, audios, or subtitles.

12. The computer-implemented method of claim 9, wherein the first secure communication channel is established by performing steps comprising transmitting, by the first server to the client application, a second certificate generated by a certificate authority.

13. The computer-implemented method of claim 9, further comprising:
   storing in the first server, additional information indicating content hosted by other servers; and
   transmitting, from the first server to the client application via the first secure communication channel, the additional information indicating the content hosted by one or more of the other servers that are associated with the at least one mapping between the first hostname and the IP address.

14. The computer-implemented method of claim 9, wherein the client application is at least one of a web browser or a video streaming application.

15. The computer-implemented method of claim 9, wherein determining that the client application is likely to request the information associated with the one or more hostnames comprises determining that a user is likely to select one or more videos within a video streaming application corresponding to the client application.

16. A system, comprising:
   a memory storing a client application; and
   a processor that is coupled to the memory and, when executing the client application, is configured to perform the steps of:
      receiving, from a first server and via a first secure communication channel, a first mapping between a first hostname associated with a second server and a first Internet Protocol (IP) address, wherein the first mapping is prefetched by the first server without receiving a request from the client application and in response to the first server determining that information associated with the first hostname is likely to be requested,
      connecting to the second server based on the first IP address, and
      establishing a second secure communication channel with the second server based on a match between the first hostname included in the first mapping and a second hostname included in a certificate associated with the second server.

17. The system of claim 16, the steps further comprising establishing the first secure communication channel with the first server.

18. The system of claim 16, the steps further comprising storing the first mapping between the first hostname associated with the second server and the first IP address in a cache, wherein the cache further stores one or more mappings between one or more hostnames and one or more IP addresses determined via the Domain Name System (DNS).

19. The system of claim 18, the steps further comprising:
   determining that a second mapping between a third hostname and a second IP address is not stored in the cache; and
   determining the second mapping between the third hostname and the second IP address via the DNS.

20. The system of claim 16, wherein the second secure communication channel is a Hypertext Transfer Protocol Secure (HTTPS) channel.

* * * * *

UNITED STATES PATENT AND TRADEMARK OFFICE
CERTIFICATE OF CORRECTION

| | | |
|---|---|---|
| PATENT NO. | : 12,348,802 B2 | Page 1 of 1 |
| APPLICATION NO. | : 17/001063 | |
| DATED | : July 1, 2025 | |
| INVENTOR(S) | : Sekwon Choi et al. | |

It is certified that error appears in the above-identified patent and that said Letters Patent is hereby corrected as shown below:

In the Claims

Column 12, Claim 6, Line 23, please delete "wherein" and insert --further comprising receiving--;

Column 12, Claim 7, Lines 28-29, please delete "are associated with" and insert --comprise--;

Column 12, Claim 7, Line 29, please delete "content." and insert --content, one or more IP addresses associated with the one or more other servers, and particular content stored in the one or more servers.--.

Signed and Sealed this
Second Day of September, 2025

Coke Morgan Stewart
*Acting Director of the United States Patent and Trademark Office*